UNITED STATES PATENT OFFICE.

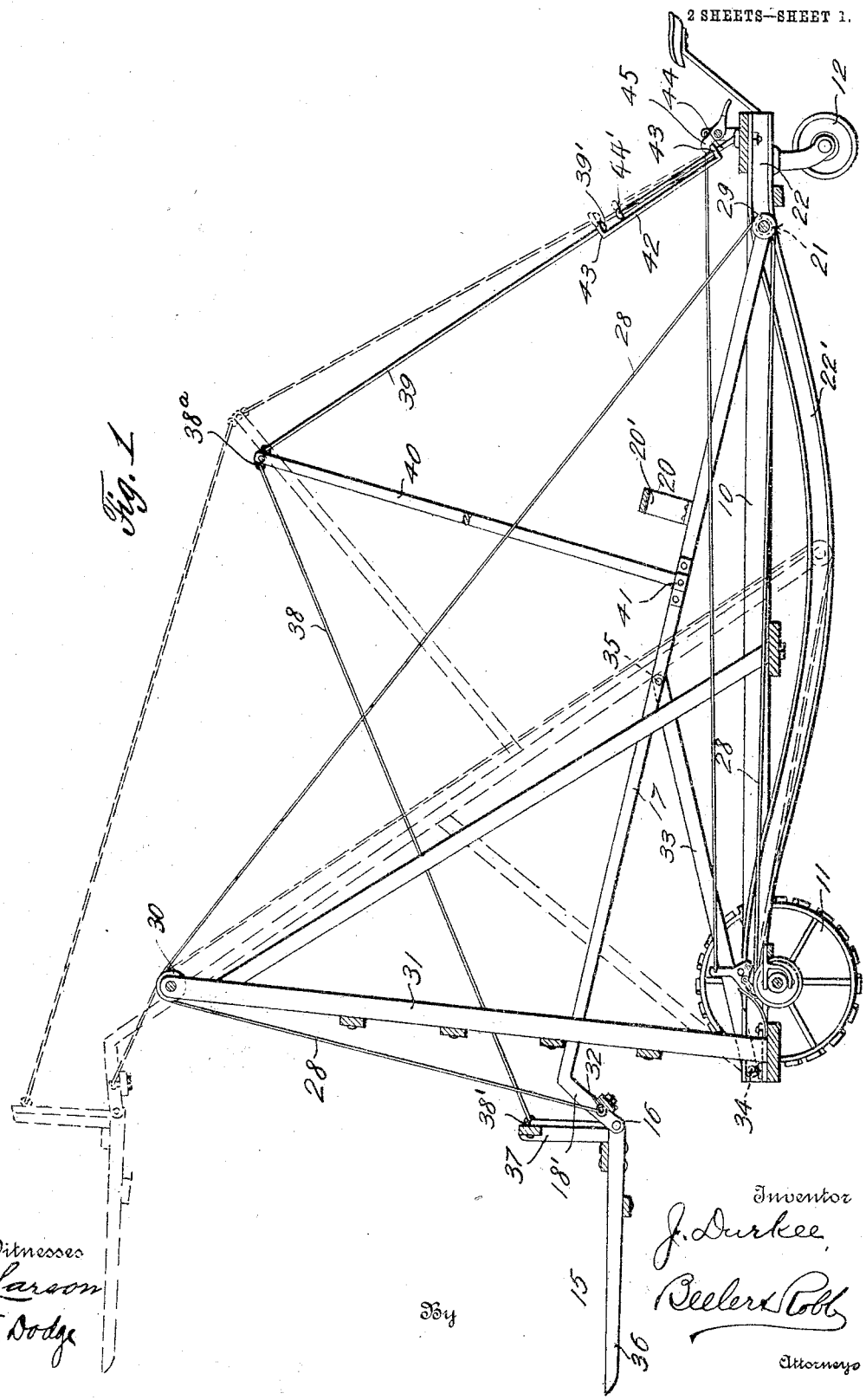

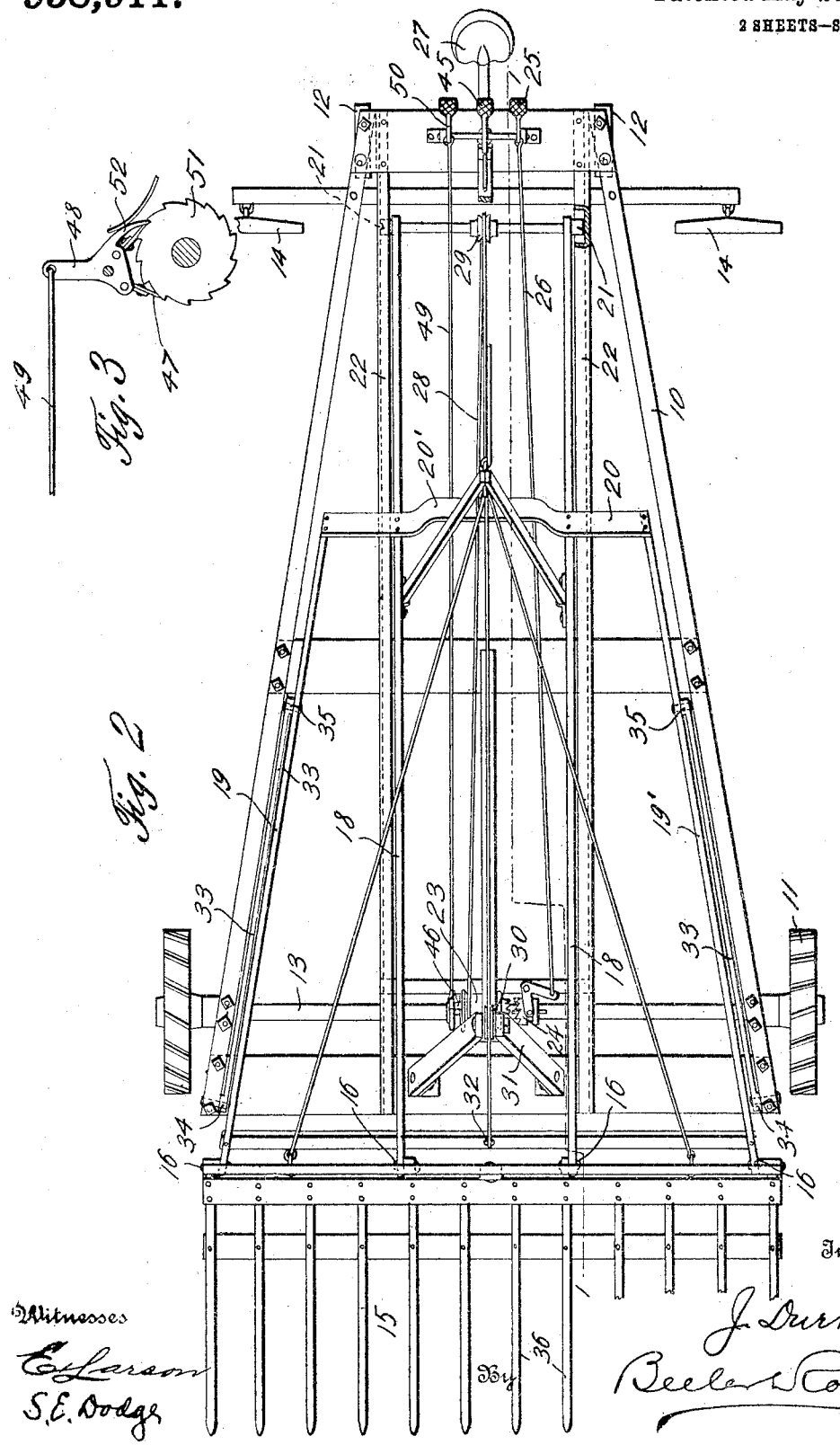

JOHN DURKEE, OF CLAY CENTER, NEBRASKA.

HAY-STACKER.

958,911.  Specification of Letters Patent.  Patented May 24, 1910.

Application filed August 5, 1909. Serial No. 511,335.

*To all whom it may concern:*

Be it known that I, JOHN DURKEE, a citizen of the United States, residing at Clay Center, in the county of Clay and State of Nebraska, have invented certain new and useful Improvements in Hay-Stackers, of which the following is a specification.

This invention relates to machinery for handling hay, and has particular reference to a machine of this class which is adapted for gathering hay from the swath or windrow and thereafter transporting it to a place of storage, such as a stack or mow, and thereafter depositing its load, all of which will fully appear in connection with the following description and accompanying drawings, in which—

Figure 1 is a vertical longitudinal section, substantially on the line 1—1 of Fig. 2, parts being in elevation, and showing in full and dotted lines two different positions of the fork and lifting mechanism; Fig. 2 is a plan view; Fig. 3 is a detail of parts connected to the hoisting drum.

Throughout the following detail description and on the several figures of the drawings similar parts are referred to by like reference characters.

This invention comprises a frame 10 supported upon traction wheels 11 and one or more caster wheels 12. The wheels 11 are connected to a power shaft 13 journaled in the frame adjacent to its front end. The frame and the parts carried thereby may be propelled by any convenient mechanism or may be drawn by horses attached, as at 14.

The fork 15 is pivotally connected at 16 to what may be called a lifting frame 17. The lifting frame comprises a pair of parallel arms 18, connected at their rear ends by a shaft 19, and at their forward ends depressed or bent downwardly as indicated at 18′, so as to bring the fork substantially down to the ground in its lowermost position. The lifting frame also includes a pair of bars 19′ whose forward ends are substantially similar to the bars 18 and likewise pivotally connected to the fork, and whose rear ends are connected by a cross bar or brace 20 rigidly with the aforesaid bars 18. The intermediate portion of the bar or brace 20 may be bowed upwardly as indicated at 20′, if desired, so as to avoid interference with the operating ropes or rods hereinafter referred to. The ends of the shaft 19 are provided with anti-friction rollers 21 which operate in a pair of channel beams 22, constituting a part of the frame 10 and whereby the rear end of the lifting frame may be permitted to advance toward the front end of the frame. The intermediate portion of the channel beams 22 may be curved downwardly, as indicated at 22′, in order that the lifting frame and fork may be hoisted in the most advantageous manner.

A hoisting drum 23 is mounted on the power shaft 13 and is adapted to be rotated thereby when engaged by a clutch 24 keyed or splined to said shaft. When the machine is advanced across a field during the operation of loading, the fork will be down upon the ground and the clutch will be free from the drum. The clutch is operated by any suitable mechanism represented by a foot lever 25 and a connecting rod 26, the foot lever being in proximity to the operator's seat 27 at the rear end of the frame. When the fork is loaded it is desired that the loaded fork be elevated from the ground to any desired height for transportation, and to this end it is only necessary to cause engagement between the clutch and the drum and the continued rotation of the power shaft 13 will cause corresponding rotation of the drum to which is connected a hoist rope 28. Said rope 28 extends from the drum rearwardly to the rear end of the lifting frame, passing thence around a pulley 29, thence upwardly and forwardly over a pulley 30 at the top of a tower or gib 31 having stationary and rigid engagement with the frame, and thence downwardly to the point 32, where it is permanently connected to the forward end of the lifting frame. By virtue of the peculiar arrangement of lifting frame and hoisting connections therefor, the power is applied practically in a direct line of the resistance in all positions of the load. The initial lifting strain on the hoist rope 28 is practically in a vertical direction, with respect to the frame of the machine, though the rear end of the frame tends to move forwardly in the channel beams 22. After the fork has been elevated upwardly toward the top of the gib the strain on the hoisting rope 28 is exerted more directly upon the lower or rear end of the lifting frame, drawing the same forwardly along the curved portion of said channel beams, whereby the fork may be lifted to an elevation considerably above the top of said gib. The fork may be carried at any desired elevation during the act of transportation and when it is desired to deposit the load upon a high stack the same may be elevated to its maximum degree at any suitable time prior to dumping. The lifting frame 17 may be braced throughout its various movements by means of a pair of braces 33, connected at one end pivotally to the front end of the frame 10 at 34 and at the other end to the side bars 19' at 35. Said braces 33 also constitute elements to determine the path of movement of the lifting frame during its operations.

It is contemplated in this invention that the fork 15, which comprises a set of fingers 36 and a rear guard 37, shall be carried in a substantially horizontal position throughout all of its movements during the hoisting thereof. To this end guy rods or ropes 38 and 39 are connected to the upper edge of said guard 37 and extend rearwardly to a tripping mechanism adjacent to the operator. The rod 38 may be double or consist of two parts, connected at their forward ends to points 38' near the ends of the fork and at their rear ends they are connected to an eye 38ª at the upper end of a standard 40 pivotally attached at 41 to the lifting frame. The rod 39 is likewise connected to the upper end of said standard. By virtue of the pivotal connection 16 and the guy rod connections just described, when the lifting frame is hoisted the fingers 36 of the fork will remain substantially horizontal. The tripping mechanism above referred to may be of any suitable construction, but preferably includes a yoke 42 having a pair of ears 43 through the upper of which the lower end of the rod 39 passes, the lower end of said rod being formed into a head 39' to prevent separation of said parts. The lower ear 43 embraces a short rod 44 connected at its lower end to the frame and having a head 44' at its upper end for the purpose of limiting the downward swinging movement of the fork. During the hoisting operations the yoke 42 is held in the position indicated in Fig. 1 by means of a dog 45 pivoted to the frame and coöperating with the lower end of the yoke. When it is desired to dump the load the operator by means of his foot trips the dog 45, permitting the weight of the load to turn the fork on its pivot 16 and move the yoke 42 upwardly or forwardly along the rod 44, and at the same time the standard 40 will move on its pivot 41 to permit such operation.

The hoisting drum 23 is provided with a brake section 46 over which a brake band or strap 47 operates, such strap 47 being connected to a brake lever 48 having a connection 49 extending rearwardly to a foot lever 50 within reach of the operator's foot. The purpose of this strap brake is to control the speed at which the fork and lifting frame may be lowered. The drum is also provided with a ratchet wheel 51 adapted to be engaged by a pawl 52, carried preferably by the brake lever 48. The brake lever is carried by the frame and its operations with respect to the drum are independent of the clutch 24. The purpose of the pawl and ratchet is to maintain the fork in an elevated position independently of the clutch. The peculiar construction and arrangement of pawl and brake are such that a single lever and connecting device may be employed for the release of the pawl and operation of the brake.

It is to be understood that the machine may be built of any suitable materials and that the relative sizes and proportions of the parts may be varied to a considerable extent within the spirit of the invention, and without sacrificing any of its advantages.

Having thus described the invention, what is claimed as new is:

1. The hereindescribed hay stacker comprising, in combination, a frame including a pair of parallel channel beams, a lifting frame, a fork connected to one end of the lifting frame, the other end of the lifting frame being guided for sliding movement along and within the channels of said channel beams, and hoisting devices associated with said lifting frame.

2. The hereindescribed hay stacker comprising, in combination, a frame including a pair of parallel channel beams, a lifting frame guided at one end for sliding movement along and within the channels of said channel beams, a fork connected to the other end of said lifting frame, a hoisting drum, a gib extending upwardly rigidly from the first mentioned frame, a hoisting rope connected to the fork end of the lifting frame and extending thence over the upper end of said gib, thence around the guided end of the lifting frame, and thence to said hoisting drum, and means to control the operation of the drum, substantially as set forth.

3. The hereindescribed hay stacker comprising, in combination, a main frame, a power shaft journaled across one end of said frame, supporting wheels secured to said shaft, a hoisting drum loosely mounted on said shaft, means connected and rotatable with the shaft to cause rotation of the drum in one direction, brake means to control the rotation of the drum in the opposite direction, a lifting frame slidably connected to the main frame at one end, a fork pivotally connected to the other end of the lifting frame, a hoisting rope connected at one end to the lifting frame near the fork and at its other end to said drum, a standard pivoted to the lifting frame, guy members connected to the standard and respectively to the fork and the opposite end of the main frame, and means operable from one end of the frame to control the hoisting and tripping of said fork.

4. The hereindescribed hay stacker comprising, in combination, a main frame, a lifting frame movably connected to the main frame, a fork pivoted to said lifting frame, means to lift said lifting frame, and means to maintain the fork in a substantially horizontal position throughout its lifting movement, said means comprising a standard pivoted to the lifting frame, and guy means connected between the fork and the upper end of the standard and other guy means connected between the upper end of the standard and the rear end of the main frame, substantially as set forth.

In testimony whereof I affix my signature in presence of two witnesses.

JOHN DURKEE.

Witnesses:
E. W. ORR,
W. F. HOLCOMB.